US006745444B2

(12) United States Patent
Moilanen

(10) Patent No.: US 6,745,444 B2
(45) Date of Patent: Jun. 8, 2004

(54) METHOD OF MANUFACTURING A SEAT

(75) Inventor: Gerald Moilanen, Commerce Township, MI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 10/378,319

(22) Filed: Mar. 3, 2003

(65) Prior Publication Data

US 2003/0184136 A1 Oct. 2, 2003

Related U.S. Application Data

(62) Division of application No. 09/527,394, filed on Mar. 16, 2000, now Pat. No. 6,543,843.

(51) Int. Cl.$^7$ ................................................. B68G 7/00
(52) U.S. Cl. ...................................... 29/91.1; 297/218.5
(58) Field of Search .......................... 29/91, 91.1, 91.5, 29/428; 297/218.5, 218.3, 218.1, 452.38; 24/326, 336, 531, 455, 453; 5/402, 410

(56) References Cited

U.S. PATENT DOCUMENTS 1,940,636 A * 12/1933 Stubnitz
4,583,279 A *  4/1986 Varunes
5,820,213 A * 10/1998 Severinski

* cited by examiner

Primary Examiner—Milton Nelson, Jr.
(74) Attorney, Agent, or Firm—Foley & Lardner LLP

(57) ABSTRACT

A method of manufacturing a seat assembly is disclosed and includes the steps of providing a seat frame having a hog lance loop, providing a trim cover, providing a fastener strip formed in a plane and having a base section and a tab section including a hinge portion connected to the base section and a body portion connected to the hinge portion, fastening the fastener strip to the trim cover, deflecting the body portion from the plane, and inserting the body portion into the hog lance loop to secure the trim cover to the seat frame.

20 Claims, 3 Drawing Sheets

METHOD OF MANUFACTURING A SEAT

This is a Divisional Application of application Ser. No. 09/527,394, titled Fastener Strip, filed Mar. 16, 2000 now U.S. Pat. No. 6,543,843.

The present Application claims the benefit of priority as available under 35 U.S.C. §120 and 121 of application Ser. No. 09/527,394, titled Fastener Strip, filed Mar. 16, 2000 (which is incorporated by reference).

TECHNICAL FIELD OF THE INVENTION

This invention generally relates to fastener strips. More specifically, this invention relates to fastener strips to secure a trim cover of a seat assembly to a conventional hog ring lance loop of a seat frame.

BACKGROUND

In the conventional techniques of the art, a trim cover of a seat assembly is attached to a hog ring lance loop of a seat frame with a hog ring. The hog ring attachment method, which includes piercing the trim cover with the hog ring and bending the hog ring into the hog ring lance loop with a compressive force, is very labor intensive. Because of the labor costs, the manufacturers of seat assemblies desire a new device to secure a trim cover of a seat assembly to a seat frame.

SUMMARY OF THE INVENTION

Accordingly, this invention provides for a fastener strip that overcomes the problems and disadvantages of the conventional techniques in the art. The invention also provides for a fastener strip that may be inserted into a conventional hog ring lance loop of a seat frame. The invention also provides for a fastener strip formed in a plane with a constant depth that is easily manufactured with an extrusion die method.

Briefly, the invention includes a fastener strip for a trim cover of a seat assembly including a base section and a tab section. The tab section includes a hinge portion connected to the base section and a body portion connected to the hinge portion. The base section, the tab section, the hinge portion, and the body portion are formed in a plane. The hinge portion allows the body portion to deflect from the plane. The body portion includes a first side that cooperates with the base section to define a first aperture, and a second side that cooperates with the base section to define a second aperture. The fastener strip may be fastened to a trim cover and the body portion may be deflected from the plane and inserted into a hog ring lance loop of a seat frame thereby locking a first portion of the hog ring lance loop in the first aperture and a second portion of the hog ring lance loop in the second aperture to secure the trim cover to the seat frame.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
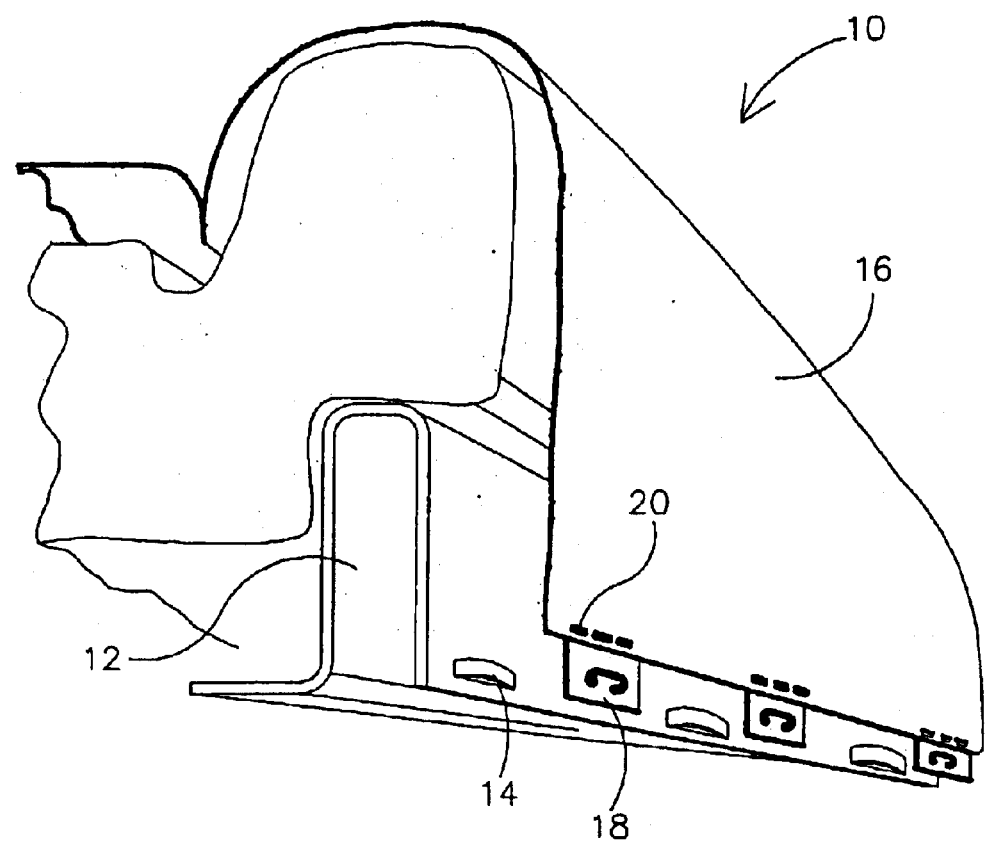
FIG. 1 is a perspective view of the seat assembly of the preferred embodiment of the invention.
Figure 2:
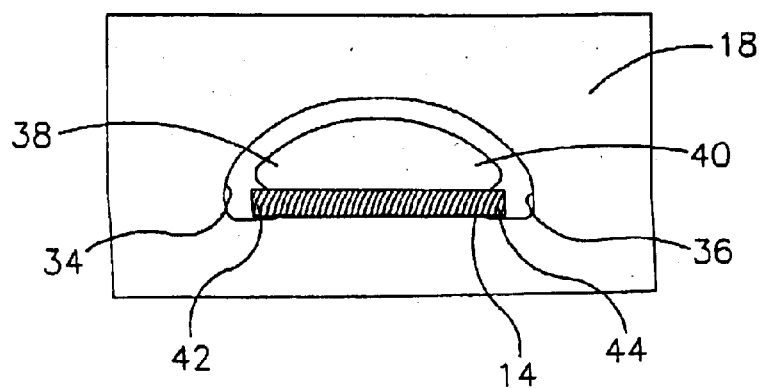
FIG. 2 is a top view of the fastener strip and the hog ring lance loop of the preferred embodiment of the invention.

As shown in FIG. 1, the seat assembly 10 of the invention includes a seat frame 12 having a conventional hog ring lance loop 14, a trim cover 16, and a fastener strip 18. The fastener strip 18 is preferably fastened to the trim cover 16 by a sewn thread 20, but may alternatively be fastened by other suitable methods, such as an adhesive, staple, or extrusion method. The seat frame 12 and the trim cover 16 are made from conventional materials and conventional methods, but may alternatively be made from other suitable materials and other suitable methods. The fastener strip 18 is specifically designed to be inserted into the hog ring lance loop 14 of the seat frame to secure the trim cover to the seat frame, as shown in FIG. 2.

Figure 3:
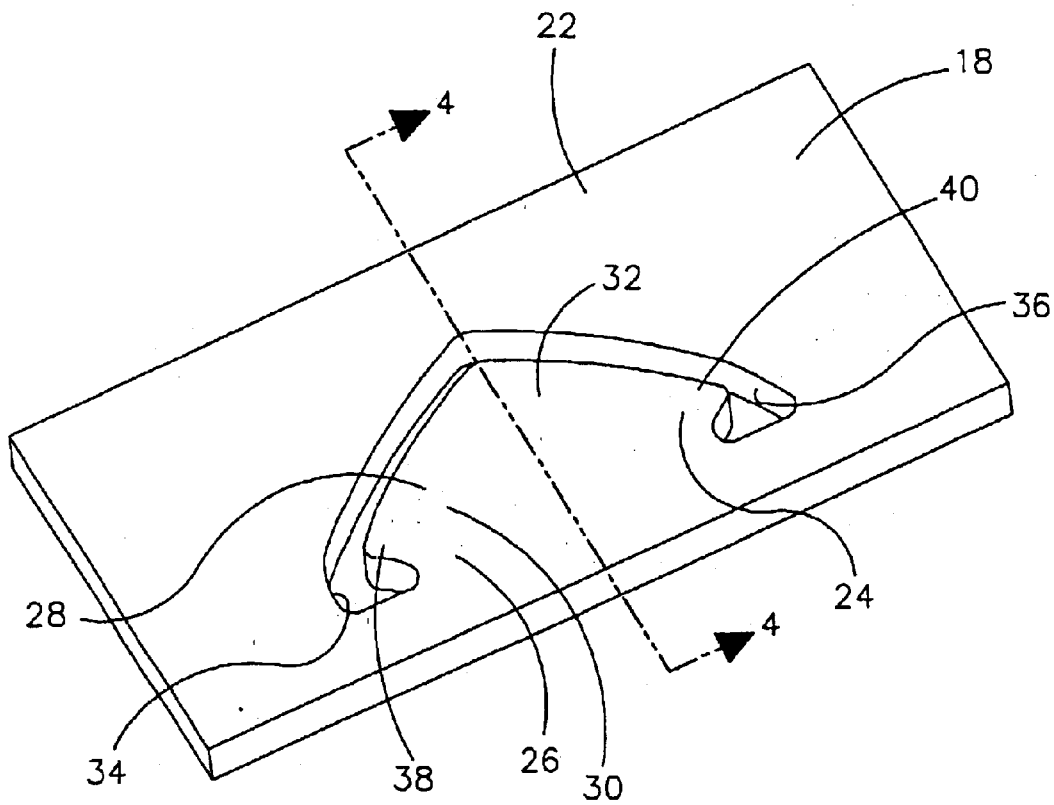
FIG. 3 is a perspective view of the fastener strip of the preferred embodiment of the invention.

As shown in FIG. 3, the fastener strip 18 of the preferred embodiment includes a base section 22, which functions to provide an attachment point for the trim cover, and a tab section 24, which functions to engage the hog ring lance loop of the seat frame. The tab section 24 preferably includes a hinge portion 26 connected to the base section 22 and a body portion 28 connected to the hinge portion 26. The body portion 28 preferably includes a first side 30 and a second side 32. The first side 30 preferably cooperates with the base section 22 to define a first aperture 34, and the second side 32 preferably cooperates with the base section 22 to define a second aperture 36. The base section 22 preferably surrounds the entire tab section 24, but may alternatively surround only the first side 30 and the second side 32 of the tab section 24.

In the preferred embodiment, the tab section 24 further includes a first barb portion 38 connected to and protruding from the first side 30 of the base section 22 and a second barb portion 40 connected to and protruding from the second side 32 of the base section 22. The first barb portion 38 and the second barb portion 40 cooperate with the base section 22 to define the first aperture 34 and the second aperture 36, respectively. As shown in FIG. 2, the first barb portion 38 and the second barb portion 40 facilitate the locking of a first portion 42 of the hog ring lance loop 14 in the first aperture 34 and a second portion 44 of the hog ring lance loop 14 in the second aperture 36. In an alternative embodiment, the tab section may extend from the base section without the first barb portion and the second barb portion.

Figure 4:
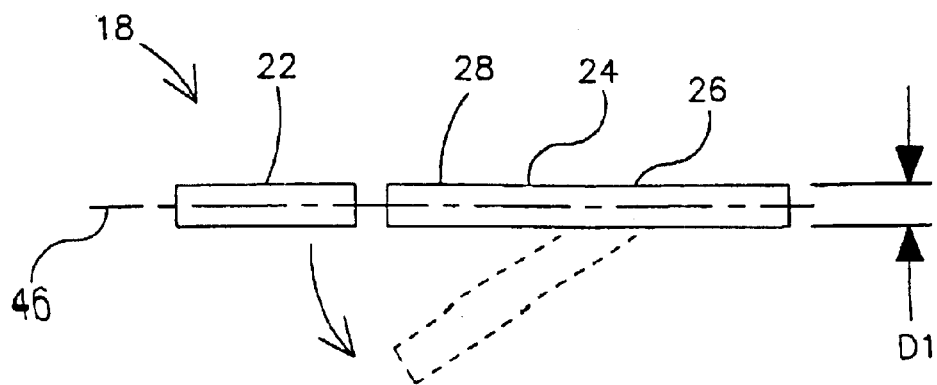
FIG. 4 is a cross-sectional view of the fastener strip of FIG. 3, taken along the line 4—4.

As shown in FIG. 4, the base section 22, the tab section 24, the hinge portion 26, and the body portion 28 are preferably formed in a plane 46. In this manner, the fastener strip 18 preferably has a substantially constant depth D1. With the constant depth D1, the fastener strip 18 is easily manufactured with an extrusion die method, the preferred method of the invention. The fastener strip 18 may alternatively be formed in several planes, with an inconsistent depth, or with other suitable methods.

Figure 5:
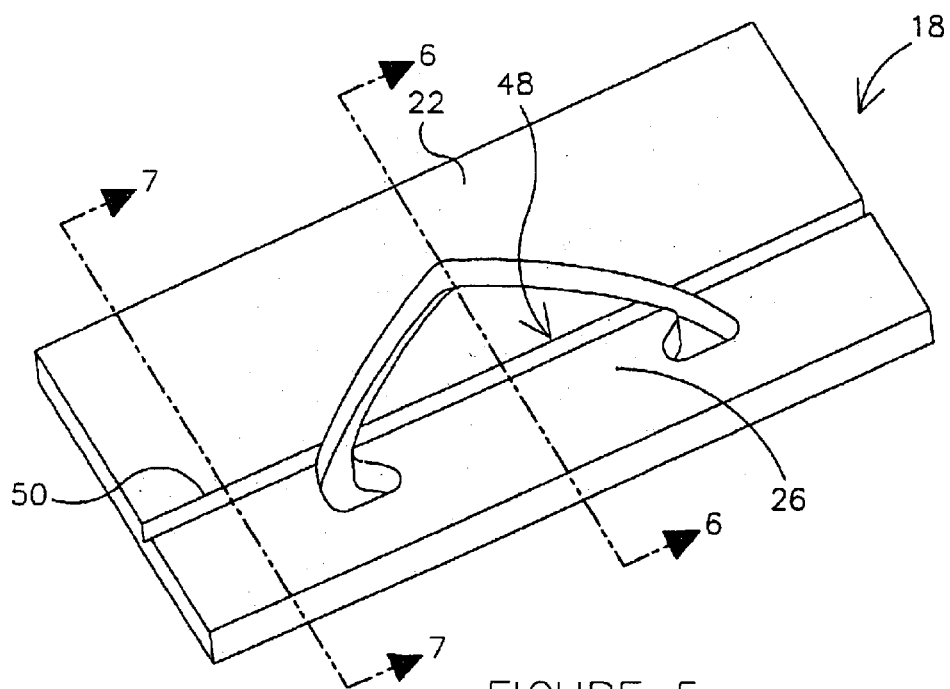
FIG. 5 is a perspective view of the fastener strip of the alternative embodiment of the invention.
Figure 6:
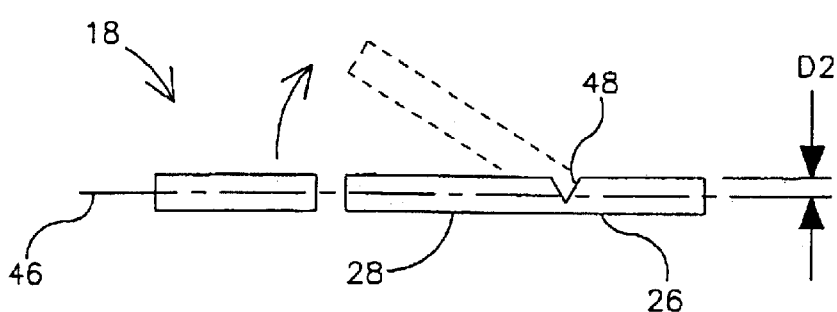
FIG. 6 is a cross-sectional view of the fastener strip of FIG. 5, taken along the line 6—6.
Figure 7:
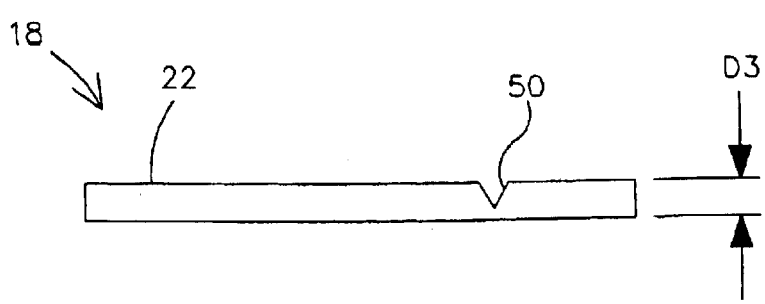
FIG. 7 is a cross-sectional view of the fastener strip of FIG. 5, taken along the line 7—7.

The hinge portion 26 allows the body portion 28 to deflect from the plane 46, which allows the insertion of the body portion 28 into the hog ring lance loop of the seat frame. As shown in FIG. 5, the hinge portion 26 of an alternative embodiment of the invention is manufactured with a hinge portion notch 48. The hinge portion notch 48 functions to facilitate the deflection of the body portion 28 from the plane 46, as shown in FIG. 6. By using appropriate materials for the fastener strip 18 and appropriate dimensions for the hinge portion notch 48, the fastener strip 18 may be designed such that the hinge portion 26 only allows deflection of the body portion 28 in one direction. The hinge portion 26 of the alternative embodiment has a hinge portion 26 depth D2, which is less than a base section depth D3 of the base section 22, as shown in FIG. 6. To facilitate extrusion manufacturing of the fastener strip 18 with a hinge portion notch 48, the base section 22 may be designed with a corresponding base section notch 50, as shown in FIGS. 5 and 7.

In a further alternative embodiment of the invention, the base section 22 may include a base section notch that does not correspond to the hinge portion notch 48. In this manner, the base section notch would allow the bending of the fastener strip 18 around an edge or a corner, such as the edge of the seat frame 12 (shown in FIG. 1).

The fastener strip is preferably made from a resilient material, which allows the deflection and rebound of the body portion. This rebound of the body portion is important for the locking of the hog ring lance loop within the first aperture and the second aperture. The fastener strip is preferably made from a plastic material, such as polypropylene or polyethylene, but may alternatively be formed from other suitable materials. The fastener strip may be made and shipped to a seat assembly manufacturer in a roll to simplify inventory-related costs. In this case, the manufacturer would cut the extended strip into the fastener strip of the invention. The fastener strip could be cut with one or more tab sections.

As understood with reference to the above paragraphs, the method of manufacturing the seat assembly of the invention includes: (a) providing a seat frame having a hog ring lance loop; (b) providing a trim cover; (c) providing a fastener strip having a base section and a tab section including a hinge portion connected to the base section and a body portion connected to the hinge portion, the fastener strip being formed in a plane; (d) fastening the fastener strip to the trim cover; (e) deflecting the body portion from the plane; and (f) inserting the body portion into the hog ring lance loop to secure the trim cover to the seat frame. In the preferred method of the invention, step (c) also includes providing a first barb portion connected to and protruding from a first side of the base section in the plane, and a second barb portion connected to and protruding from a second side of the base section in the plane. Although the steps outline the preferred method of manufacturing the seat assembly of the invention, other steps may be used to provide similar results.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A method of manufacturing a seat assembly, comprising:
   (a) providing a seat frame having a hog ring lance loop;
   (b) providing a trim cover;
   (c) providing a fastener strip having a base section and a tab section including a hinge portion connected to the base section and a body portion connected to the hinge portion, the fastener strip being formed in a plane;
   (d) fastening the fastener strip to the trim cover;
   (e) deflecting the body portion from the plane; and
   (f) inserting the body portion into the hog ring lance loop to secure the trim cover to the seat frame.

2. The method of claim 1 wherein step (c) further comprises providing a substantially constant depth within the plane of the fastener strip.

3. The method of claim 1 wherein step (c) further comprises manufacturing the fastener strip with an extrusion die.

4. The method of claim 1 wherein step (c) further comprises providing a notch in the hinge portion.

5. The method of claim 1, wherein step (c) includes providing a first barb portion connected to and protruding from a first side of the body portion in the plane, and a second barb portion connected to and protruding from a second side of the body portion in the plane.

6. The method of claim 5 wherein step (c) further comprises configuring the first barb portion and the second barb portion to lock the hog lance loop.

7. Then method of claim 1 wherein step (c) further comprises forming the fastener strip from a resilient material.

8. The method of claim 7 wherein step (c) further comprises providing a plastic material as the resilient material.

9. A method for attaching a trim cover to a frame of a seat assembly, comprising:
   providing a loop coupled to the frame;
   attaching a fastener strip to the trim cover, the fastener strip including at least one tab section with a hinge;
   coupling the tab section to the loop by deflecting the tab section about the hinge.

10. The method of claim 9 further comprising the step of inserting the tab section at least partially through the loop.

11. The method of claim 9 wherein the step of attaching a fastener strip further comprises providing a location having a reduced thickness on the hinge.

12. The method of claim 9 further comprising the step of bending the fastener strip around a corner of the frame.

13. The method of claim 9 wherein the step of attaching a fastener strip further comprises coupling the fastener strip to the trim cover by a sewn connection.

14. A method for attaching a trim cover to a seat frame, comprising:

providing at least one loop coupled to the seat frame;

attaching a fastener strip to the trim cover, the fastener strip including at least one body portion defining a first barb and a second barb;

coupling the body portion to the loop by engaging the first and second barbs with the loop and extending the body portion at least partially through the loop.

15. The method of claim 14 wherein the step of attaching a fastener strip comprises configuring the first barb and the second barb on opposite sides of the body portion.

16. The method of claim 14 wherein the step of attaching a fastener strip comprises coupling the fastener strip to the trim cover by an adhesive connection.

17. The method of claim 14 wherein the step of attaching a fastener strip comprises coupling the fastener strip to the trim cover with an extrusion.

18. The method of claim 14 wherein the step of attaching a fastener strip comprises coupling the fastener strip to the trim cover by a sewn connection.

19. The method of claim 14 wherein the step of coupling the body portion comprises deflecting the body portion about a hinge portion.

20. The method of claim 14 wherein the step of attaching a fastener strip comprises forming the fastener strip from a resilient material.

* * * * *